United States Patent
Soderberg et al.

(10) Patent No.: US 6,865,605 B1
(45) Date of Patent: Mar. 8, 2005

(54) SYSTEM AND METHOD FOR TRANSPARENTLY REDIRECTING CLIENT REQUESTS FOR CONTENT USING A FRONT-END INDICATOR TO PRESERVE THE VALIDITY OF LOCAL CACHING AT THE CLIENT SYSTEM

(75) Inventors: Joel Soderberg, Edmonds, WA (US); Brian Deen, North Bend, WA (US); Alex Hopmann, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 716 days.

(21) Appl. No.: 09/679,716

(22) Filed: Oct. 4, 2000

(51) Int. Cl.⁷ .................. G06F 15/173; G06F 15/16
(52) U.S. Cl. .................. 709/226; 709/223; 709/224; 709/229; 709/238; 709/239
(58) Field of Search ................. 709/200, 217, 709/219, 224, 226, 229, 239

(56) References Cited

U.S. PATENT DOCUMENTS

| | | | | |
|---|---|---|---|---|
| 5,812,776 A | * | 9/1998 | Gifford | 709/217 |
| 5,918,013 A | * | 6/1999 | Mighdoll et al. | 709/217 |
| 6,138,162 A | * | 10/2000 | Pistriotto et al. | 709/229 |
| 6,185,598 B1 | * | 2/2001 | Farber et al. | 709/200 |
| 6,185,619 B1 | * | 2/2001 | Joffe et al. | 709/229 |
| 6,311,216 B1 | * | 10/2001 | Smith et al. | 709/226 |
| 6,330,606 B1 | * | 12/2001 | Logue et al. | 709/226 |
| 6,389,462 B1 | * | 5/2002 | Cohen et al. | 709/239 |
| 6,466,966 B1 | * | 10/2002 | Kirsch et al. | 709/219 |
| 6,601,098 B1 | * | 7/2003 | Case et al. | 709/224 |
| 6,604,143 B1 | * | 8/2003 | Nagar et al. | 709/229 |

OTHER PUBLICATIONS

Fielding et al, Hypertext Transfer Protocol, Jun. 1999, Copyright © The Internet Society (1999), http://www.ietf.org/rfc/rfc2616.txt, pp. 1–176.*
Hypertext Transfer Protocol, Network Working Group; http://www.ietf.org/rfc/rfc2616.txt, Jun. 1999.

* cited by examiner

Primary Examiner—Rupal Dharia
Assistant Examiner—Quang N. Nguyen
(74) Attorney, Agent, or Firm—Workman Nydegger

(57) ABSTRACT

Methods and computer program products for transparently redirecting a request for content such that a client system is unaware of the redirection. A client requests content through a front-end server that provides a single point of access for content stored on one or more back-end servers. The single point of access makes it so the client does not know and does not care which particular back-end server stores the requested content. When a back-end server provides a redirect response for content that the back-end server does not store, the front-end server receives the redirect response and reissues the request to a server identified in the redirect response. A front-end server indicator is added to requests so that the back-end server knows the request is from a front-end server. This allows the back-end server to provide a list of servers in the redirect response without causing errors in clients making direct requests to back-end servers when the clients are unable to process a list of servers contained in a redirect response.

25 Claims, 5 Drawing Sheets

SYSTEM AND METHOD FOR TRANSPARENTLY REDIRECTING CLIENT REQUESTS FOR CONTENT USING A FRONT-END INDICATOR TO PRESERVE THE VALIDITY OF LOCAL CACHING AT THE CLIENT SYSTEM

CO-PENDING APPLICATIONS CONTAINING RELATED MATERIAL

The following applications, which are filed the same day as this application, are hereby incorporated by reference: U.S. application Ser. No. 09/680,120, entitled "Selecting a Server to Service Client Requests," and U.S. application Ser. No. 09/679,720, entitled "Routing Client Requests to Back-End Servers."

BACKGROUND OF THE INVENTION

1. The Field of the Invention

The present invention relates to redirecting requests for content that is stored on a server. More specifically, the present invention relates to methods and computer program products for using a front-end server in transparently redirecting a request for content such that a client system is unaware of the redirection.

2. The Prior State of the Art

At times, a server may need to redirect requests for content. Redirection may occur because (i) the content has moved, either temporarily or permanently, to another server, (ii) multiple representations of the content are available and the client should choose from them, (iii) the request should be made through a proxy, and etc. In the prior art, servers send redirect responses to the client system and the client system is responsible for reissuing the request for content to the server identified in the redirect response. However, sending redirect responses to a client may not provide any benefit in some systems.

For example, some systems include a proxy server that provides a single point of access to content stored on back end servers. The back end server is a server in the ordinary sense, storing content that clients may access. The proxy or front end server provides an access point for the content that is stored on one or more back end servers. From the client's perspective, it appears as if the front end server is the source for all of the content stored at the back end servers. However, clients are not necessarily precluded from accessing back end servers directly.

Making requests for content through front-end servers provides several benefits. From time to time, content stored on one back-end server may be moved to another. If a client has been accessing the moved content directly, the client must alter future requests to reflect the new location of the content. Although redirect responses from the old back-end server may help inform clients that the content has moved, redirection requires additional processing by the client and leads to slower response times for the requested content. Also, redirect responses from back-end servers may be provided on a temporary basis. Requests occurring after a certain time period may indicate simply that the requested content is not available.

Front-end servers also facilitate local caching at the client system. Frequently, content, such as email content, is cached at the client system to improve performance. Only changes made to the email content is exchanged between the client and back-end server. If email content is moved from one back-end server to another, the local caching is invalidated and the full email content must be exchanged. By using a front-end server, all content appears to come from a single source, regardless of the particular back-end server that actually stores the content. Any movement of content from one back-end server to another is transparent to the client. As a result, local caching remains valid even after content has been moved.

However, redirection, as taught in the prior art, introduces problems when practiced in a front-end server system. First, the front-end server is supposed to make the storage of content at back-end servers transparent to the client. In receiving a redirect response because content has moved from one back-end server to another, the client is made aware of back-end server storage details and transparent access to the content is eliminated. Furthermore, because the client made the request to the front-end server, a redirect response from a back-end server that is unknown to the client is likely to cause substantial confusion. Even more troublesome, certain back-end servers may require that all access occur through a front-end server. In these circumstances, the client would be redirected to a back-end server that the client is unable to access. Therefore, the prior art lacks methods and computer program products for using a front-end server in transparently redirecting a request for content such that a client system is unaware of the redirection.

SUMMARY OF THE INVENTION

These and other problems with the prior art are overcome by the present invention, which is directed toward transparently redirecting a request for content such that a client system is unaware of the redirection. A front-end server receives requests for content stored on one or more back-end servers. By making the requests through the front-end server, the client does not know and does not care which back-end server stores the content being requested. As far as the client is concerned, the front-end server is the source of the requested content.

Content may be stored on one or more back-end servers. Private content, such as email, calendars, tasks, etc., typically is stored at only one back-end server, whereas public content, like applications, discussion groups, etc., typically is stored on multiple servers. At times, a front-end server may request data from a back-end server that the back-end server does not store. For example, if private content is moved, the back-end server generates a redirect response that identifies the back-end server storing the moved content. Rather than pass the redirect response back to the client as is taught in the prior art, the front-end server reissues the content request to the back-end server identified in the redirect response. Upon receiving the requested content from the redirect back-end server, the front-end sends the content to the client system.

Public content is likely to be stored on multiple back-end servers. However, the prior art allows for only a single server to be identified in a redirect response. When the front-end server receives a request for content from a client, the request is modified to indicate that the front-end is making the request to the back-end server. The back-end server receiving the request for content examines the request to determine if the request includes the front-end indicator. If present, the back-end server identifies a list of back-end servers that store the requested content. By receiving a list of back-end servers, the front-end server is able to load balance requests for content among all the back-end servers that can satisfy the request. If the front-end indicator is not present, the back-end server identifies a single back-end server in the redirect response. In identifying only a single back-end server, the redirect response will be compatible with prior art clients making direct requests to back-end servers.

Because the front-end server processes redirections, rather than passing them to the client as taught in the prior art, the front-end server preserves the benefits of having transparent back-end server storage. Specifically, content can move from one back-end server to another without impacting the client.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
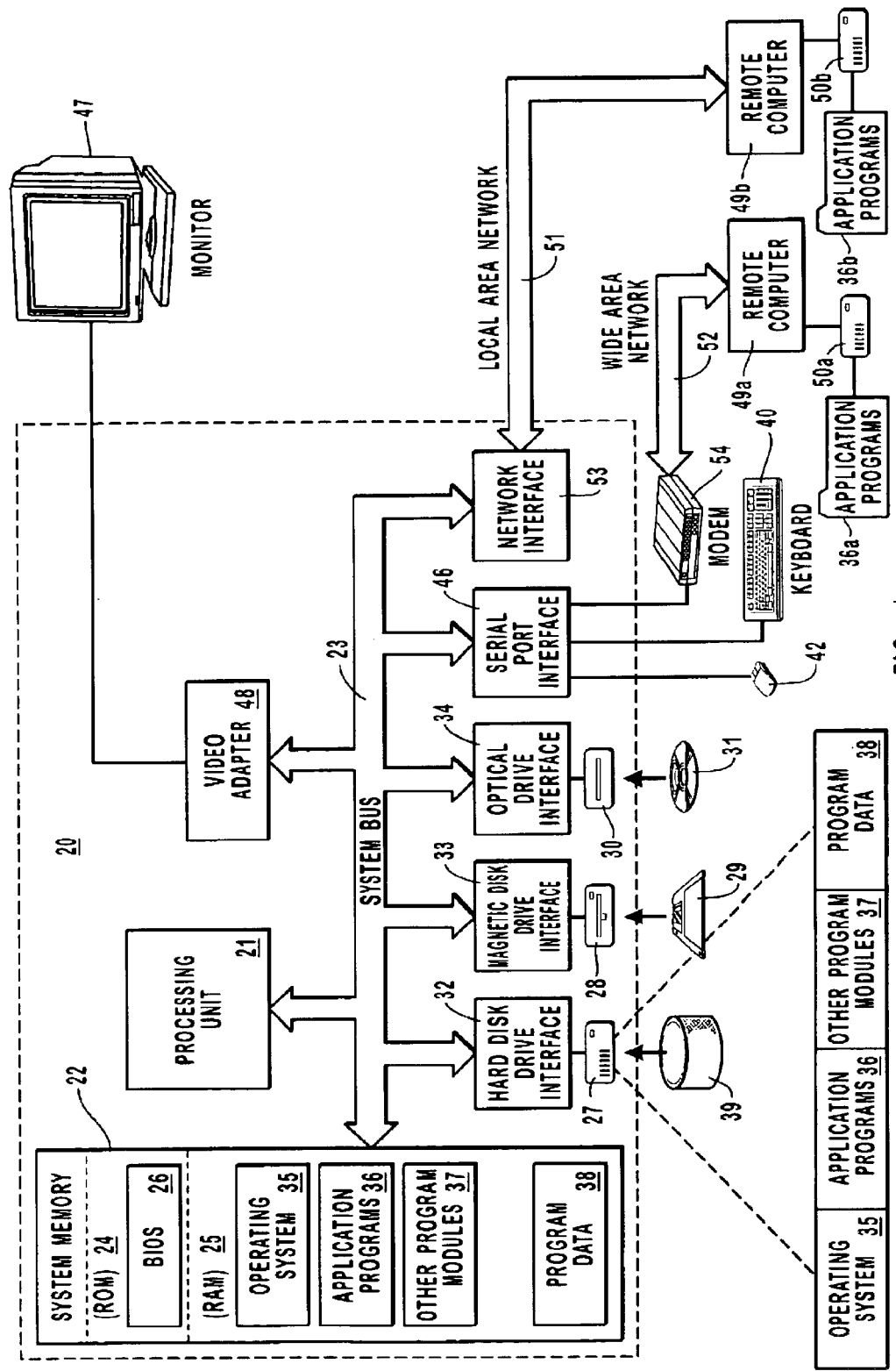
FIG. 1 illustrates an exemplary system that provides a suitable operating environment for the present invention.

Client requests for data may be redirected from one server to another. Some redirections occur because data has been either temporarily or permanently moved to a new server. In the prior art, redirections are sent to the client system that initiated the request and the client reissues the request to the server indicated in the redirection. Where a proxy requests data for a client, the proxy returns redirection responses to the client for processing. However, redirection according to the prior art proves to be inadequate for certain systems. For example, U.S. application No. Ser. 09/679,720, filed on the same day herewith, entitled "Routing Client Requests to Back-End Servers," which is hereby incorporated by reference, describes the use of a front-end server to access content stored on one or more back-end servers. The specific back-end server storing requested content is unknown and transparent to the client.

One benefit of accessing content through a front-end server as described in the afore-referenced application is that the client system is insulated from having to identify the is specific server storing the data being requested. The client requests data from the front-end server and the front-end server determines which back-end server should satisfy the request. Use of the front-end server also insures that local caching on the client remains valid when content moves from one back-end server to another because it appears to the client that the front-end server is the source of content.

With all requests for content being directed to the front-end server, redirection presents a problem because it identifies specific back-end servers. For example, a redirect response may not provide any meaningful information. In some systems, clients may be allowed access to back-end servers only through a front-end server. This makes the redirection information of no use to the client because reissuing the request directly to the identified back-end server will result in the request being denied. Even if the back-end server is directly accessible to the client, a direct request to the back-end server prevents the client from receiving any of the benefits offered by the front-end server arrangement.

In a Microsoft Exchange® system, redirections may occur for a variety of reasons. For example, Exchange public folder trees may be replicated across multiple back-end servers to provide greater accessibility. However, the extent of content replication (in contrast to folder tree replication) is controlled on a folder-by-folder basis. As a result, a given back-end server may include the folder hierarchy, but not the folder contents. A folder is termed "ghosted" when the folder is present in the public folder tree of a back-end server, but the contents are not replicated on the back-end server.

The front-end server may direct requests for content based on the public folder tree. If a request is for the contents of a folder that is ghosted, the back-end server issues a redirect response that identifies other back-end servers where the content is replicated. According to the present invention, the front-end server receives the redirect response from the back-end server and reissues the redirected request rather than passing the redirect response back to the client. When the front-end server receives the requested content from a back-end server identified in the redirect response, the content is sent to the client From the client's perspective, the content's source is the front-end server. The client has no indication that the redirection occurred.

Because replicated data may be stored on more than one server, the back-end server ghosting a folder is capable of identifying a list of back-end servers in a redirect response. However, prior art clients are unable to receive a list of servers in a redirect response. As a result, front-end servers add a front-end indicator to any requests they direct to back-end servers. If a back-end server receives a request with the front-end indicator, the back-end server knows that a list may be returned. Returning a list of servers allows the front-end server to load balance requests across all back-end servers capable of servicing a particular request. U.S. application Ser. No. 09/680,120, filed on the same day herewith, entitled "Selecting a Server to Service Client Requests," which is hereby incorporated by reference, describes how a particular back-end server may be identified to load balance requests. Otherwise, if the front-end indicator is not present, the back-end server returns a single back-end server in the redirect response. In one embodiment the front-end indicator is a string added to the standard HTTP "User-Agent" header and the server list is returned in an extended HTTP 305 Use Proxy redirect response. However, the present invention is not limited to the use of any particular HTTP headers or responses.

In Exchange systems it is also possible that access to the mailbox storage of an email client will result in a redirect response. The front-end server accesses a global catalog to identify the specific back-end server that stores email for a particular user. However, there may be a short delay between the time an email storage is moved and the time that the move is reflected in the global catalog. A request for email content made to the old back-end server will result in a redirect response. As described above, the front-end server will process the redirect response and issue a request for the content to the back-end server identified in the redirection. As a general rule, email storage is located on only one back-end server at a time. Redirect responses for email content, therefore, typically will identify a single server rather than a list. Like email content, other types of private content (content that is specific to a single user), such as calendars, task data, etc., is stored ordinarily at only one back-end server.

By processing redirect responses, front-end servers allow clients to make requests for content without knowing or caring about which particular back-end server stores the requested content. The present invention extends to both methods and computer program products for transparently redirecting a request for content such that a client system is unaware of the redirection. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in it network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port, or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
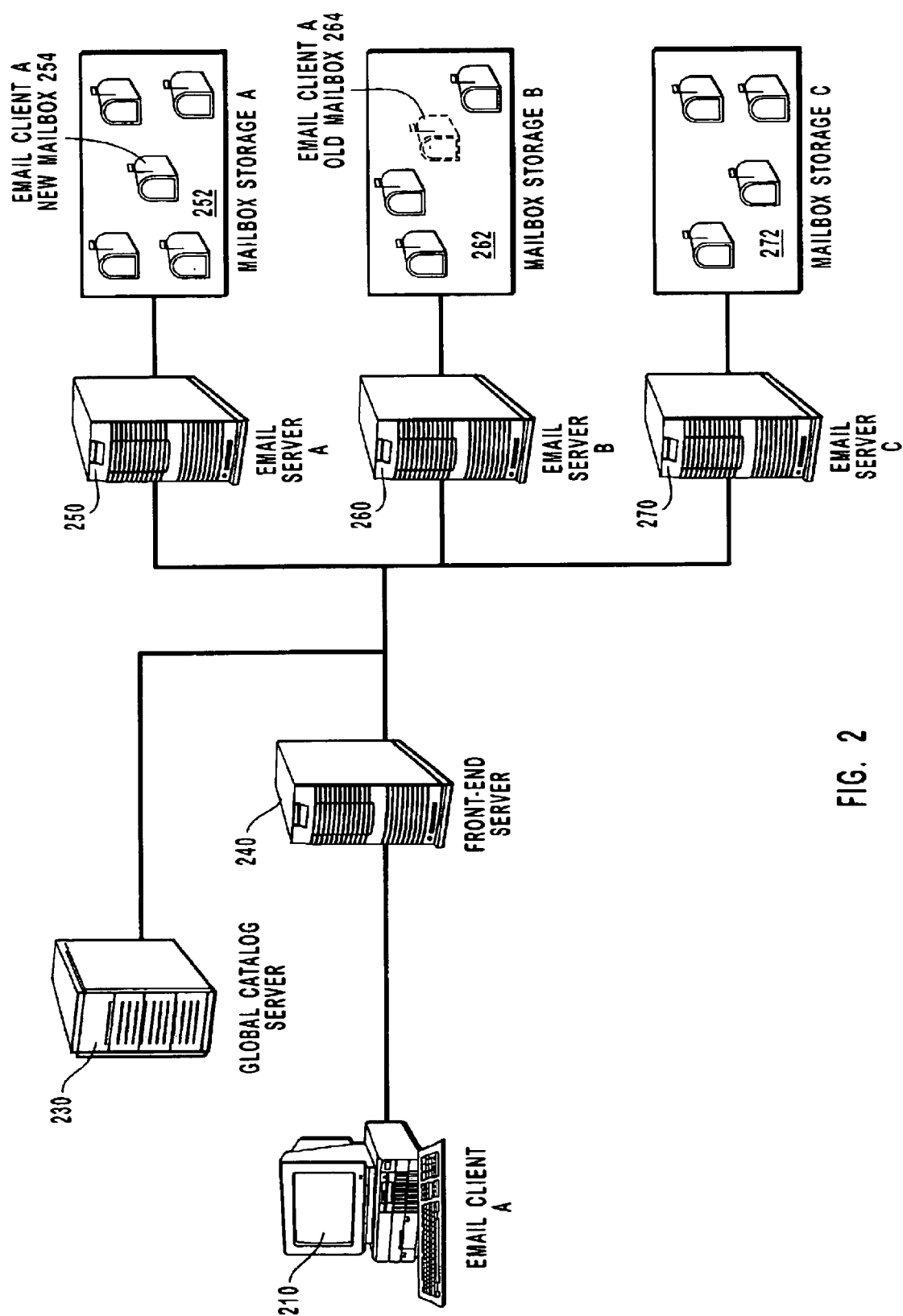
FIG. 2 shows a client system accessing email content that has moved from one back-end server to another.

FIG. 2 shows a client system accessing email content that has moved from one back-end server to another. Email server A 250 includes mailbox storage A 252 containing email client A new mailbox 254, whereas email server B 260 includes mailbox storage B 262 containing email client A old mailbox 264. Email server C 270 includes mailbox storage C 272. Email server A 250, email server B 260, and email server C 270 are examples of back-end servers. Email client A new mailbox 254 and email client A old mailbox 264 are examples of resources available through front-end server 240. Global catalog server 230 provides front-end server 240 with current information regarding the content stored at each of the available back-end servers. Additionally, the front-end server 240 is stateless and does not require, for example, a hard drive for storing program data. U.S. application Ser. No. 09/680,120, filed on the same day herewith, and entitled "Selecting a Server to Service Client Requests," which is hereby incorporated by reference, provides greater detail with respect to how a particular back-end server may be identified and how a front-end server operates.

Email client A 210 uses front-nd server 240 in accessing email content. Various protocols are available that allow front-end server 240 to route content requests on behalf of email client A 210. Internet message access protocol 4 ("IMAP4"), post office protocol version 3 ("POP3"), and hypertext transfer protocol ("HTTP") are all protocols that front-end server 240 can direct to a particular back-end server on behalf of email client A 210. The present invention, however, is not limited to any particular protocol. It is only necessary that the protocol allow for requests to be routed by a front-end server. For example, messaging application programming interface ("MAPI") is a protocol that currently will not allow front-end server 240 to route requests for email client A 210.

Comparing requests for content by email client A 210 with and without front-end server 240 may be helpful in understanding the present invention. For simplicity, assume that all requests use HTTP as their email protocol. Without front-end server 240, a request by email client A 210 for the contents of the email client A old mailbox 264 might be entered as "http://serverB/exchange/clientA" and a request by email client A 210 for the contents of the email client A new mailbox 254 might be entered as "http://serverA/exchange/clientA". Note that in each case, it was necessary to specify the server where the mailbox contents were stored. In contrast, if the front-end server 240 were named "mail" a request by email client A 210 for the contents of the email client A new mailbox 254 might be entered as "http://mail/exchange/clientA".

By using front-end server 240, email client A 210 does not know and does not care what back-end server stores the requested email content. When the email content is moved from email client A old mailbox 264 on server B 260 to email client A new mailbox 254 on server A 250, front-end server 240 will direct the request to the appropriate back-end server automatically. Nevertheless, there may be a short time delay between when email content is moved from server B 260 to server A 250 and when global catalog server 230 reflects the move. During this time delay, front-end server 240 continues to direct requests for the email content of email client A 210 to server B 260. Upon receiving a request, server B 260 generates a redirect response that indicates that the email content for email client A 210 now is located at server A 250.

In contrast to the prior art, when front-end server 240 receives the redirect response, front-end server 240 reissues the request for email content to server A 250 rather than passing the redirect response back to email client A 210. As shown in FIG. 2, email client A 210 may only access email content through front-end server 240. A redirect response indicating that server A 250 stores the email content from email client A 210 would be of no benefit to email client A 210 because server A 250 cannot be reached directly. Furthermore, such a redirect response may confuse email client A 210 because no request for content was made to server B 260, and therefore a redirect response from server B 260 is unexpected. Front-end server 240 overcomes these problems with prior art redirection by processing the redirect response without any indication to email client A 210 that any redirection has occurred. U.S. application Ser. No. 09/679,720, filed on the same day herewith, entitled "Routing Client Requests to Back-End Servers," which is hereby incorporated by reference, provides further details on the operation of front-end server 240 in requesting email content for email client A 210. The present invention should not be interpreted as requiring that back-end server only be accessible through a front-end server.

Figure 3:
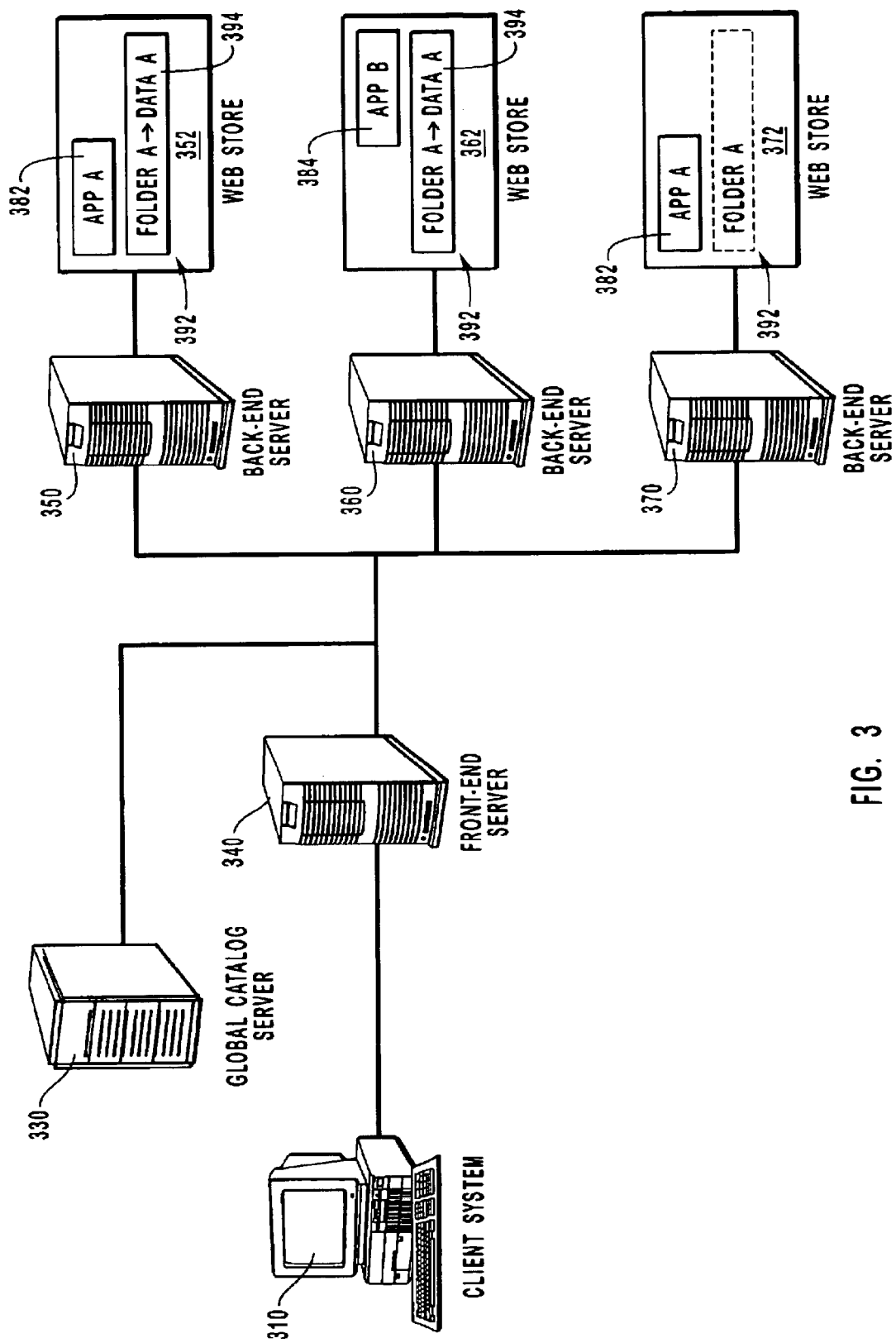
FIG. 3 show a client system accessing content that is stored at various back-end servers through a front-end server.

The present invention is not limited to any particular protocol and it is not limited to any particular content. FIG. 3 shows client system 310 using front-end server 340 to access content that is stored at various back-end servers. Back-end server 350 includes web store 352 containing App A 382 and Folder A 392 that stores Data A 394. Back-end server 360 includes web store 362 containing App B 384 and Folder A 392 that stores Data A 394. Back-end server 370 includes web store 372 containing App A 382 and Folder A 392. However, Folder A 392 is dashed in web store 372 to indicate that the storage hierarchy is present at back-end server 370, but the data (e.g., Data A 394) is not.

App A 382, App B 384, and Folder A 392 are examples of public content stored at a back-end server. App A 382 is available in web stores 352 and 372, whereas App B 384 is only available in web store 362. Folder A 392 represents a storage hierarchy for organizing public content. Microsoft Exchange® products allow the determination of whether data corresponding to a folder will be stored on a particular server to be made on a folder-by-folder basis. Folder A 392 in web store 372 is set not to store any data. One reason for not storing the data for a folder is that the folder may be of minor significance for the users of a particular server. Because the folder is seldom if ever accessed, it is better to conserve the storage space that would otherwise be required for storing the folder's contents.

Nevertheless, by including the hierarchy on each server, it is possible to access the contents of each folder on any server. A request for the contents of Folder A 392 made to web store 372 will result in a redirect response that indicates where the contents of Folder A 392 may be accessed. Most likely, the access will be slower than would be provided by access to web store 372 because lower bandwidth communication links may be used, but this added burden is a minor imposition given the relative infrequency of access to Folder A 392 at back-end server 370. A folder within the storage hierarchy that does not include the folder's contents is said to be "ghosted."

When client system 310 requests App A 382 from front-end server 340, global catalog server 330 identifies a list of servers that includes back-end server 350 and back-end server 370. Front-end server 340 uses an authentication token associated with authentication credentials received from client system 310 as a key for performing a hashing operation over the list of servers. The hashing operation insures that requests for content are evenly distributed over the servers where the content is available and that a given request and authentication token will identify the same server each time the request is made (as long as the available servers do not change). By requesting data from the same back-end server each time a given request is made, any user-specific state information may be stored and recalled at the back-end server, such as a read/unread state for messages in a public folder. Authentication tokens and authentication credentials may be stored in global catalog server 330 and/or cached in front-end server 340.

Client system 310 requesting App B 384 from front-end server 340, identifies a single server, back-end server 360, from global catalog server 330. Like the mailbox examples from FIG. 2, no hashing operation occurs because the content only may be requested from one back-end server. Thus, for both public and private content, it is possible that the hashing operation will not be necessary to identify a particular back-end server where the content request is directed.

Global catalog server 330 identifies back-end server 350, back-end server 360, and back-end server 370, in response to a request for the contents of Folder A 392 from front-end server 340. If the hashing operation identifies back-end server 350 or back-end server 360, the request is directed to the identified back-end server as described above. But, if back-end server 370 is identified, front-end server 340 must perform additional work in order to direct the request to a back-end server that can satisfy the request because the requested content is ghosted. When front-end server 340 directs the request to back-end server 370, back-end server 370 generates a redirect response. The contents of the redirect response depend on whether or not front-end 340 has modified the request to indicate that the response is from a front-end server. If so, the redirect response includes a list of back-end servers that can satisfy the request for the ghosted folder. Otherwise, the redirect response includes a single back-end server capable of satisfying the request. U.S. application Ser. No. 09/680,120, filed on the same day herewith, and entitled "Selecting to Service Client Requests," which is hereby incorporated by reference, provides additional information on identifying a back-end server when public content is ghosted on a back-end server.

Figure 4A:
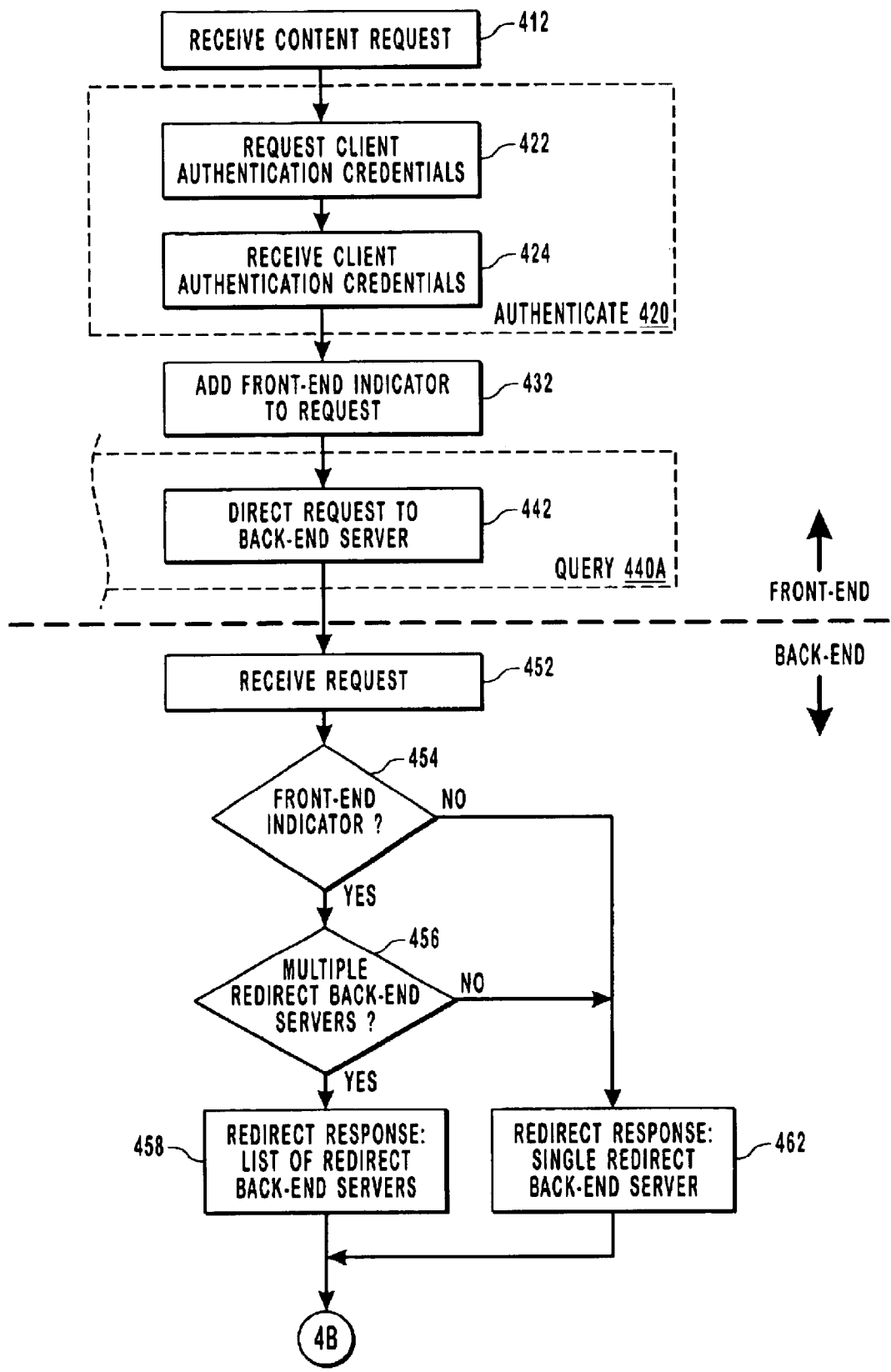
FIGS. 4A and 4B are flowcharts illustrating exemplary methods for redirecting requests for content stored at a back-end server according to the present invention.
Figure 4B:
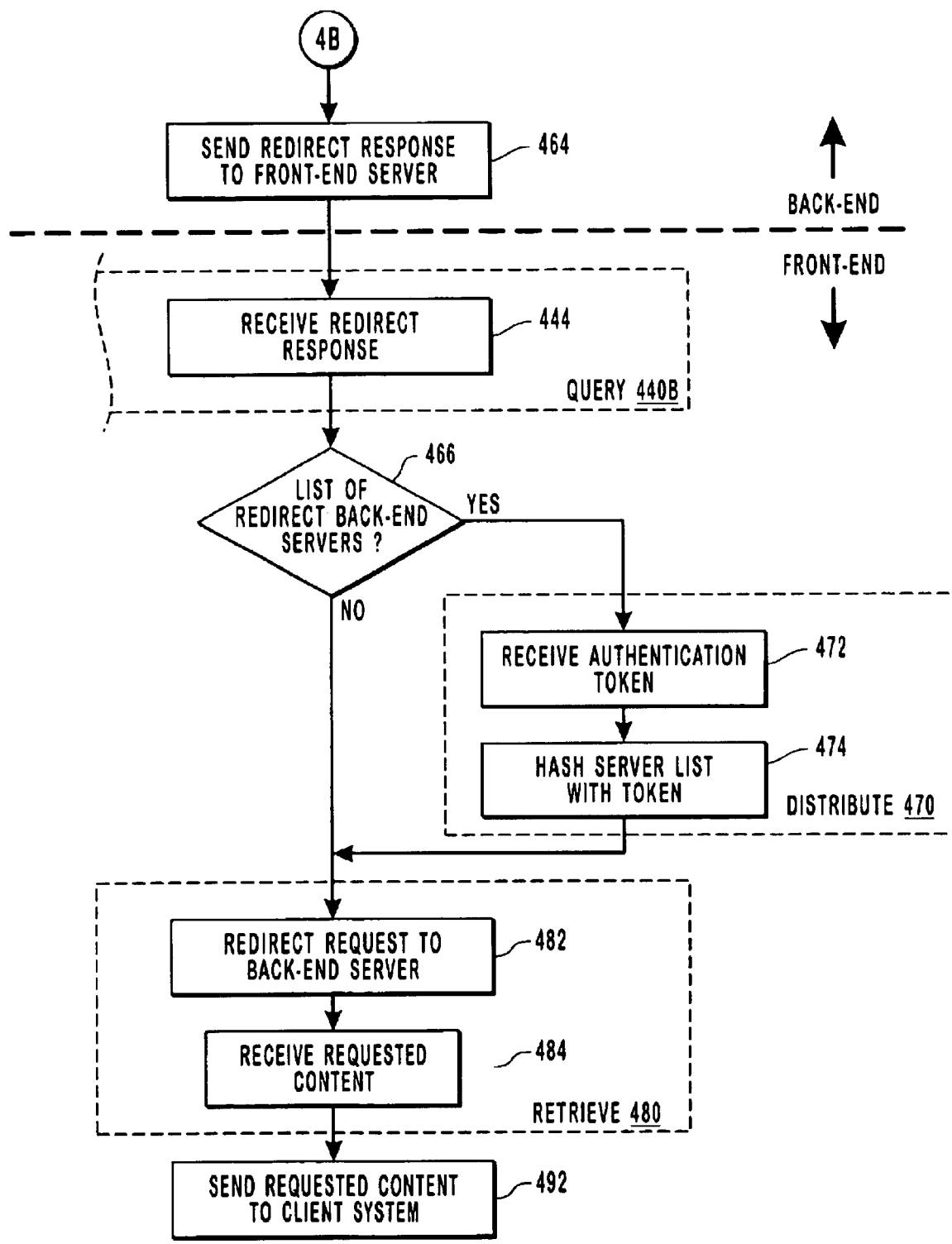

FIGS. 4A and 4B are flowcharts illustrating exemplary methods for redirecting requests for content stored at a back-end server according to the present invention. The dashed line between blocks 442 and 452 of FIG. 4A indicates that the acts and steps above the line are performed at a front-end server whereas the acts and steps below the line are performed at a back-end server. A similar dashed line is included in FIG. 4B. Returning to FIG. 4A, block 412 represents the act of the front-end server receiving a request for content. As part of a step for authenticating the client (420), the front-end server may perform the acts of requesting client authentication credentials (422) and receiving the proper client authentication credentials (424) back from the client.

The front-end server adds a front-end indicator to the request (432) so that a back-end server receiving the request will know that it was sent by a front-end server rather than by a client. The step for querying (440A and 440B of FIG. 4B) a back-end server for the content may include the acts of directing the request to a particular back-end server (442) and receiving a redirect response (444 of FIG. 4B) from the particular back-end server. In generating the redirect response, the back-end server performs the following, acts. The back-end server receives the request for content (452) and, in decision block 454, examines the request for a front-end indicator. If no front-end indicator is present, the redirect response includes a single redirect back-end server (462). With a front-end indicator present, decision block 456 determines if multiple back-end servers can satisfy the request for content. Here too, if only one back-end server is identified, the redirect response includes a single redirect back-end server (462). However, if multiple back-end servers are able to satisfy the content request, the redirect response includes a list of redirect back-end servers (458). After the one or more redirect back-end servers have been identified, the redirect response is sent to the front-end server (464 of FIG. 4B).

As described earlier, as part of a step for querying the back-end server for requested content (440A of FIGS. 4A and 440B), the front-end performs the act of receiving the redirect response from the back-end server. In decision block 466, the front-end server determines if the redirect response includes a list of back-end servers or a particular back-end server. If a list was received, the front-end server receives an authentication token (472) and hashes the list (474) with the authentication token as a key to identify a particular back-end server. The acts of receiving an authentication token (472) and hashing a list of back-end servers (474) may be included within a step for distributing a request for content to one of the back-end servers in the list. The authentication token may be identified during the step for authenticating the client (420 of FIG. 4A).

Once a particular back-end server is identified, the front-end server redirects the request to the particular back-end server (482) and receives the requested content from the redirect back-end server (484). The acts of redirecting the request (482) and receiving the requested content (484) are acts that may occur in a step for retrieving the requested content is from a particular redirect back-end server. After the content is received, the front-end server sends the requested content to the client system (492).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

What is claimed is:

1. In a computerized system that includes a client system, a front-end server, and one or more back-end servers, all interconnected with a communication link, a method of transparently redirecting a request for content such that the client system is unaware of the redirection, the method comprising the front-end server performing the acts of:

receiving a request for the content from the client system, the front-end server making it appear as if the front-end server is the source of the content, which actually is stored at a back-end server;

directing the request to a particular back-end server;

receiving from the particular back-end server, a redirect response identifying one or more other back-end servers where the content is stored;

automatically and without client system intervention, redirecting the request to a redirect back-end server, the redirect back-end server being one of the one or more other back-end servers identified in the redirect response;

receiving the requested content from the redirect back-end server; and sending the requested content to the client system from the front-end server so that any local caching of the content received from the front-end server remains valid at the client system regardless of which of the one or more back-end servers actually stores the content.

2. A method as recited in claim 1 further comprising the act of adding a front-end indicator to the request in order to indicate that the front-end server is making the request on behalf of the client system, wherein the front-end indicator is added to a hypertext transfer protocol User Agent header.

3. A method as recited in claim 1 wherein the redirect response identifies a list of back-end servers where the content is stored.

4. A method as recited in claim 3 wherein the list of back-end servers is identified in a hypertext transfer protocol 305 Use Proxy response from the particular back-end server.

5. A method as recited in claim 3, further comprising the acts of:

requesting authentication credentials from the client system; and receiving proper authentication credentials from the client system.

6. A method as recited in claim 5 further comprising the acts of:

receiving an authentication token that is associated with the authentication credentials; and using the authentication token as a key for a hash operation to identify the redirect back-end server from the list of back-end servers identified in the redirect response.

7. A method as recited in claim 1 wherein the redirect response identifies a single back-end server where the content is stored.

8. A method as recited in claim 7, wherein the single back-end server is identified in either a hypertext transfer protocol 301 Moved Permanently or 302 Moved Temporarily response from the particular server.

9. A method as recited in claim 1, further comprising the acts of:

receiving the requested content from the redirect back-end server; and sending the requested content to the client system.

10. In a computerized system that includes a client system, a front-end server, and one or more back-end servers, all interconnected with a communication link, a method of redirecting a request for content directed to a particular back-end server when the content is not stored at the particular back-end server, the method comprising the back-end server performing the acts of:

receiving a content request from the client system through the front-end server, the content request including a front-end indicator in order to indicate that the front-end server is making the content request on behalf of the client system;

examining the content request for the front-end indicator;

if the front-end indicator is present in the content request, creating a redirect response to the content request that includes a list identifying a plurality of redirect back-end servers where the content is stored so that the front-end server can load balance among the plurality of redirect back-end servers capable of satisfying the content request, and otherwise creating a redirect response to the content request that includes a single redirect back-end server where the content is stored; and sending the redirect response to the front-end server so that the front-end server can redirect the request to one or more redirect back-end servers.

11. A method as recited in claim 10 wherein the front-end indicator is added to a hypertext transfer protocol User Agent header.

12. A method as recited in claim 10 wherein the list of one or more redirect back-end servers is identified in a hypertext transfer protocol 305 Use Proxy response from the particular back-end server.

13. In a computerized system that includes a client system, a front-end server, and one or more back-end servers, all interconnected with a communication link, a method of transparently redirecting a request for content such that the client system is unaware of the redirection, the method comprising the front-end server performing:

an act of receiving a request for the content from the client system as if the front-end server were the source of content stored at the one or more back-end servers;

a step for querying a particular back-end server for the requested content, wherein the response to the query identifies one or more other back-end servers where the content is stored, the one or more other back-end servers being either inaccessible or unknown to the client system;

a step for, automatically and without user intervention, retrieving the requested content from a redirect back-end server, the redirect back-end server being one of the one or more other back-end servers identified in the query response; and an act of sending the requested content to the client system from the front-end server so that any local caching of the requested content received from the front-end server remains valid at the client system even if the requested content later moves from the redirect back-end server or is retrieved from a back-end server other than the redirect back-end server.

14. A method as recited in claim 13 further comprising a step for authenticating the client system.

15. A method as recited in claim 14 wherein the query response identifies a list of back-end servers where the content is stored, the method further comprising a step for distributing the request to the redirect back-end server based on the client system authentication.

16. A method as recited in claim 13 wherein the query response identifies a single back-end servers where the content is stored.

17. In a computerized system that includes a client system, a front-end server, and one or more back-end servers, all interconnected with a communication link, a computer program product for implementing a method of transparently redirecting a request for content such that the client system is unaware of the redirection, comprising:

a computer readable medium for carrying machine-executable instructions for implementing the method; and wherein said method is comprised of machine-executable instructions for the front-end server performing the acts of:

receiving a request for the content from the client system, the front-end server making it appear as if the front-end server is the source of the content, which actually is stored at a back-end server;

directing the request to a particular back-end server;

receiving from the particular back-end server, a redirect response identifying one or more other back-end servers where the content is stored;

automatically and without client system intervention, redirecting the request to a redirect back-end server, the redirect back-end server being one of the one or more other back-end servers identified in the redirect response;

receiving the requested content from the redirect back-end server; and sending the requested content to the client system from the front-end server so that any local caching of the content received from the front-end server remains valid at the client system regardless of which of the one or more back-end servers actually stores the content.

18. A computer program product as recited in claim 17, wherein the redirect response identifies a list of back-end servers where the content is stored.

19. A computer program product as recited in claim 18, the method comprised further of machine-executable instructions for performing the acts of:

requesting authentication credentials from the client system; and receiving proper authentication credentials form the client system.

20. A computer program product as recited in claim 19, the method comprised further of machine-executable instructions for performing the acts of:

receiving an authentication token that is associated with the authentication credentials; and using the authentication token as a key for a hash operation to identify the redirect back-end server from the list of back-end servers identified in the redirect response.

21. A computer program product as recited in claim 17, wherein the redirect response identifies a single back-end server where the content is stored.

22. A computer program product as recited in claim 17, the method comprised further of machine-executable instructions for performing the act of adding a front-end indicator to the request in order to indicate that the front-end server is making the request on behalf of the client system.

23. In a computerized system that includes a client system, a front-end server, and one or more back-end servers, all interconnected with a communication link, a computer program product for implementing a method of redirecting a request for content directed to a particular back-end server when the content is not stored at the particular back-end server, comprising:

a computer readable medium for carrying machine-executable instructions for implementing the method; and wherein said method is comprised of machine-executable instructions for the particular back-end server performing the acts of:

receiving a request for the content from the client system through the front-end server, the request including a front-end indicator in order to indicate that the front-end server is making the request on behalf of the client system;

examining the content request for the front-end indicator;

if the front-end indicator is present in the content request, creating a redirect response to the request that includes a list identifying a plurality of redirect back-end servers where the content is stored so that the front-end server can load balance among the plurality of redirect back-end servers capable of satisfying the content request, and otherwise creating a redirect response to the content request that includes a single redirect back-end server where the content is stored; and sending the redirect response to the front-end server so that the front-end server can redirect the request to one or more redirect back-end servers.

24. A method as recited in claim 23 wherein the front-end indicator is added to a hypertext transfer protocol User Agent header.

25. A method as recited in claim 23 wherein the list of one or more redirect in a hypertext transfer protocol 305 Use Proxy response from the particular back-end server.

* * * * *